United States Patent
Iscan et al.

(10) Patent No.: US 11,894,923 B2
(45) Date of Patent: Feb. 6, 2024

(54) TRANSMITTER AND A TRANSMISSION METHOD USING A PSCM SCHEME

(71) Applicant: HUAWEI TECHNOLOGIES CO., LTD., Guangdong (CN)

(72) Inventors: Onurcan Iscan, Munich (DE); Wen Xu, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 173 days.

(21) Appl. No.: 17/390,027

(22) Filed: Jul. 30, 2021

(65) Prior Publication Data
US 2021/0359784 A1     Nov. 18, 2021

Related U.S. Application Data

(63) Continuation of application No. PCT/EP2019/052370, filed on Jan. 31, 2019.

(51) Int. Cl.
H04L 1/00 (2006.01)
(52) U.S. Cl.
CPC .......... H04L 1/0005 (2013.01); H04L 1/0042 (2013.01)
(58) Field of Classification Search
CPC .................................................. H04L 1/0005
See application file for complete search history.

(56) References Cited

U.S. PATENT DOCUMENTS

| | | | | |
|---|---|---|---|---|
| 2009/0128378 A1* | 5/2009 | Cideciyan | ............. | H03M 5/145 341/59 |
| 2010/0260043 A1* | 10/2010 | Kimmich | ............... | H04N 19/89 370/316 |
| 2014/0369680 A1* | 12/2014 | Oveis Gharan | ....... | H04L 1/0003 398/25 |

FOREIGN PATENT DOCUMENTS

| | | | | |
|---|---|---|---|---|
| CN | 102282777 A | 12/2011 | | |
| WO | 2018133939 A1 | 7/2018 | | |
| WO | 2019015742 A1 | 1/2019 | | |
| WO | 2019015743 A1 | 1/2019 | | |
| WO | WO-2019015742 A1 * | 1/2019 | ........... | H04L 1/0042 |
| WO | WO-2019015743 A1 * | 1/2019 | ............ | H03M 13/13 |

OTHER PUBLICATIONS

3GPP TR 45.912 V1.0.0, "3rd Generation Partnership Project; Technical Specification Group GSM/EDGE Radio Access Network; Feasibility study for evolved GSM/EDGE Radio Access Network (GERAN) (Release 7)," Jul. 2006, 498 pages.

Office Action issued in Chinese Application No. 201980090836.6 dated Aug. 24, 2022, 4 pages.

Yang, "Optimum Design of Polar Codes in Distributed Scenario," Master Thesis, Beijing University of Posts and Telecommunications, Sep. 2017, 127 pages (with English abstract).

Office Action issued in Chinese Application No. 201980090836.6 dated Mar. 18, 2022, 8 pages.

(Continued)

Primary Examiner — Abdeltif Ajid
(74) Attorney, Agent, or Firm — Fish & Richardson P.C.

(57) ABSTRACT

Example transmission methods and apparatus are described. In one example method, a transmitter is configured to communicate with a receiver via a communication channel. The transmitter is configured to precode a data word into a precoded data word using a probabilistic shaping scheme, wherein the probabilistic shaping scheme depends on one or more precoding parameters. The precoded data word is encoded into a codeword using a modulation and/or coding scheme, wherein the modulation and/or coding scheme depends on one or more modulation and coding parameters. At least one precoding parameter is determined on the basis of at least one of the one or more modulation and coding parameters and/or on the basis of at least one further precoding parameter.

19 Claims, 5 Drawing Sheets

(56) References Cited

OTHER PUBLICATIONS

Iscan et al., "Polar Codes with Integrated Probabilistic Shaping for 5G New Radio", ArXiv:1808.09360v1 [cs.IT], Aug. 28, 2018, 5 pages.
Iscan et al., "Probabilistically Shaped Multi-Level Coding with Polar Codes for Fading Channels," ArXiv:1812.07864 [cs.IT], Dec. 19, 2018, 5 pages.
Iscan et al., "Shaped Polar Codes for Higher Order Modulation," IEEE Communications Letters, vol. 22, No. 2, Oct. 26, 2017, 4 pages.
PCT International Search Report and Written Opinion issued in International Application No. PCT/EP2019/052370 dated Oct. 16, 2019, 13 pages.
Valenti et al., "Constellation Shaping for Bit-Interleaved LDPC Coded APSK," IEEE Transactions on Communications, vol. 60, No. 10, Oct. 1, 2012, 11 pages.

\* cited by examiner

|     | L = 1    | L = 2    | L = 4    | L = 8    | L = 16   | L = 32   |
|-----|----------|----------|----------|----------|----------|----------|
| $M_L$ | −0.2083  | −0.3607  | −0.3586  | −0.3966  | −0.4654  | −0.5086  |
| $B_L$ | 0.3241   | 0.3563   | 0.3795   | 0.4058   | 0.4879   | 0.6479   |

Fig. 4

$$\frac{\kappa}{n} = 1 - h_2(p) + A(n, L)\sqrt{(p - p^2)\log_2^2\left(\frac{1-p}{p}\right)}$$

$$A(n, L) = B_L \cdot n^{M_L}$$

TRANSMITTER AND A TRANSMISSION METHOD USING A PSCM SCHEME

CROSS-REFERENCE TO RELATED APPLICATIONS

This application is a continuation of International Application No. PCT/EP2019/052370, filed on Jan. 31, 2019, the disclosure of which is hereby incorporated by reference in its entirety.

TECHNICAL FIELD

Generally, the present invention relates to communication systems. In particular, the present invention relates to a transmitter as well as a transmission method using a probabilistically shaped coded modulation (PSCM) scheme.

BACKGROUND

According to Shannon's theorem, the capacity of a transmission channel can only be achieved if the channel input symbols (e.g. Quadrature Amplitude Modulation (QAM) symbols, Amplitude Shift Keying (ASK) symbols, and the like), which are generated by the transmitter and fed to the channel, are distributed according to a capacity achieving (optimal) probability distribution. The distribution is channel-dependent, i.e. depending on the characteristics of the channel, the optimal distribution is different. For example, for AWGN channels, the Gaussian distribution is optimal. This means that in order to perform close to the capacity, the channel input symbols need to be distributed according to a Gaussian distribution.

Conventionally, many communication systems do not take the optimal symbol distribution into account. For example, the legacy mobile communication systems (such as 3G, 4G) employ bit-interleaved coded modulation (BICM) with uniformly distributed symbols. The reason for this choice is its simplicity: if no special measures are taken, a transmitter usually generates symbols that are selected from a set with equal probability, i.e. each channel input symbol is transmitted with equal probability. This leads to the so called 'shaping loss', as the optimal distribution is not employed. On AWGN channels, the shaping loss can be up to 1.53 dB, i.e. one would need to use 1.53 dB more power than theoretically required to transmit the symbols reliably.

There are different solutions to avoid or reduce the shaping loss. A promising solution is PSCM, where the transmitter chain is modified in a way, such that the generated codewords prior to the symbol mapper have a desired (non-uniform) probability distribution. Accordingly, the generated symbols after symbol mapping have the optimal (or near optimal) probability distribution. One possible way to obtain such a result is to use a 'Shaping Encoder' 101 prior to a channel encoder 101, as shown in the conventional transmitter 100 of FIG. 1, which often further includes a symbol mapper 105. As will be appreciated, in communication systems without probabilistic shaping, the data is fed directly to a channel encoder without using a shaping encoder. The task of the shaping encoder 101 is to introduce additional redundancy (shaping redundancy), that causes the codeword (and hence the channel input symbols) to have a target probability distribution.

A polar coding based PSCM scheme (called 'Shaped Polar Codes') has been presented in Işcan, Onurcan, Ronald Böhnke, and Wen Xu. "Shaped Polar Codes for Higher Order Modulation," IEEE Communications Letters 22.2 (2018): 252-255. In this approach, a precoder 201 is used as the shaping encoder prior to the channel encoder 203, which generates and appends 'shaping bits' s to its input (data bits d), before feeding them to the channel encoder 203 of the transmitter 200 shown in FIG. 2. The task of the shaping bits is to obtain a binary codeword c at the output of the channel encoder 203, wherein certain parts of the codeword c contain bits with non-uniform probability distribution, i.e. the probability of certain bits (at predefined locations in the codeword) of being 1 is p, where p is a real number between 0 and 1 and is not equal to 0.5, i.e. the distribution of the bits is non-uniform. This results in a non-uniform symbol distribution, after the codeword is mapped to channel input symbols, e.g. by means of a symbol mapper not shown in FIG. 2.

The channel encoder based on polar codes may contain a polar transform, one or more interleavers, a bit-selector and/or a (binary) scrambler.

For shaped polar coding, two parameters are particularly important, namely (i) the bit probability p and (ii) the number of shaping bits s, i.e. the length of the string of shaping bits s. These two parameters are related to each other in such a way that for a given number of shaping bits s, one may obtain the resulting bit probability p. However, this relation is not straightforward, and depends on different factors.

Note that different choices of the shaping bits s (of the same length) would produce a different codeword c, however, it will represent the same data bits, i.e. there are multiple possibilities to generate s. An optimal precoder would generate the shaping bits in a way such that a target p is obtained as accurately as possible. On the other hand, different choices of s can result in similar performance in terms of accuracy of p. How s is generated depends on how the precoder is configured and implemented, i.e. there is not a single choice of the shaping bits a that fulfills the requirements. Therefore, it may be advantageous to not to seek for the optimal choice with an optimal precoder (which may be too complex to implement), but for a nearly optimal solution, for which the implementation of the precoder is simple.

As already mentioned above, in Işcan, Onurcan, Ronald Böhnke, and Wen Xu. "Shaped Polar Codes for Higher Order Modulation," IEEE Communications Letters 22.2 (2018): 252-255, it is shown that a 'polar decoder' can be used as a precoder. Note that polar decoding is normally a receiver side operation, therefore it is placed in the receiver chain of the communication system. However, many communication systems are bi-directional, i.e. the nodes contain both the transmitter chain and the receiver chain. The implementation of a decoder is often vendor-specific and, thus, most likely not specified in any (standard) technical documents. There are different types of decoders, wherein all of them have their own (implementation specific) parameters.

In modern communication systems the parameter selection procedure is mostly described in the standard documents. For instance, parameter selection for rate adaptive transmission in LTE is defined with large tables where the relevant parameters are obtained according to the Modulation and Coding Scheme (MCS), Transport Block Size (TBS), number of physical resource blocks, etc. PSCM is not yet included in any of the wireless communication standards. Therefore, there exists no systematic way of obtaining the PSCM related parameters in the existing technical specifications. There is some academic work on probabilistic shaping, but they do not consider a systematic way of obtaining the required parameters, and how the alignment between the transmitter and the receiver should be (i.e. how signaling of the shaping related parameters should be performed).

In light of the above, there is a need for an improved transmitter as well as a corresponding improved transmission method enabling parameter selection and signaling of signal shaping related parameters, such that they are easy to calculate and are suitable for signaling for alignment with a receiver.

SUMMARY

It is an object of the invention to provide an improved transmitter as well as a corresponding improved transmission method enabling parameter selection and signaling of signal shaping related parameters, such that they are easy to calculate and are suitable for signaling for alignment with a receiver.

The foregoing and other objects are achieved by the subject matter of the independent claims. Further implementation forms are apparent from the dependent claims, the description and the figures.

According to a first aspect the invention relates to a transmitter configured to communicate with a receiver via a communication channel. The transmitter is configured to: precode a data word into a precoded data word using a probabilistic shaping scheme, wherein the probabilistic shaping scheme depends on one or more precoding parameters; encode the precoded data word using a modulation and/or coding scheme into a codeword, wherein the modulation and/or coding scheme depends on one or more modulation and coding parameters; and determine at least one precoding parameter on the basis of at least one modulation and coding parameter, i.e. at least one of the one or more modulation and coding parameters and/or on the basis of at least one further precoding parameter.

Thus, an improved transmitter using a PSCM scheme is provided enabling parameter selection and signaling of signal shaping related parameters, such that they are easy to calculate and are suitable for signaling for alignment with a receiver.

In a further possible implementation form of the first aspect, the transmitter is further configured to provide the at least one modulation and coding parameter and/or the at least one further precoding parameter to the receiver.

In a further possible implementation form of the first aspect, the at least one precoding parameter is a parameter specific to an implementation of a precoder that performs the precoding, in particular an identifier of a specific precoder type and/or a parameter of the specific precoder type.

In a further possible implementation form of the first aspect, the one or more modulation and coding parameters comprise a codeword length, a message length, a modulation order, a code rate, a constellation, and/or a modulation and coding scheme index.

In a further possible implementation form of the first aspect, the transmitter is configured to determine the at least one precoding parameter by using a lookup table, an analytical function and/or a characteristic curve.

In a further possible implementation form of the first aspect, the encoding is based on a polar code.

In a further possible implementation form of the first aspect, the precoding and/or the precoder is based on a channel decoder, in particular a channel decoder for a polar code. The same channel decoder (type) can be used by the receiver for decoding the data received from the transmitter. Advantageously, this leads to a simplified structure of the transmitter, because the channel decoder can be used both in the receiver chain as well as in the transmitter chain.

In a further possible implementation form of the first aspect, the channel decoder is a Successive Cancellation (SC) decoder, a SC List (SCL) decoder, a Belief Propagation (BP) decoder, a flip decoder, a stack decoder or a non-binary decoder.

In a further possible implementation form of the first aspect, the at least one precoding parameter is a parameter specific to the channel decoder, in particular a list size, a sequence of frozen bits, a set of frozen sub-channel indices, an iteration number, and/or a Galois field size.

In a further possible implementation form of the first aspect, the precoded data word comprises the data word.

In a further possible implementation form of the first aspect, the precoded data word comprises at least one shaping bit and wherein the transmitter is configured to determine the number of shaping bits on the basis of the at least one of the modulation and coding parameters and/or on the basis of the at least one further precoding parameter.

In a further possible implementation form of the first aspect, the transmitter is further configured to determine a bit probability of bits in the codeword, in particular a bit probability of a predefined subset of the bits in the codeword.

In a further possible implementation form of the first aspect, the transmitter is configured to provide the bit probability to the receiver.

In a further possible implementation form of the first aspect, the transmitter is configured to determine the bit probability on the basis of the number of shaping bits and on the basis of the one or more modulation and coding parameters.

In a further possible implementation form of the first aspect, the transmitter is configured to determine the bit probability on the basis of the at least one of the modulation and coding parameters and/or on the basis of the at least one further precoding parameter.

In a further possible implementation form of the first aspect, the transmitter is configured to determine the number of shaping bits by selecting the number of shaping bits from a predefined finite set of possible numbers of shaping bits.

In a further possible implementation form of the first aspect, the transmitter is further configured to activate and/or deactivate the precoding and, in particular, to inform the receiver whether the codeword has been generated with the precoding being active or deactive and/or wherein the transmitter is configured to provide an indication, e.g. a flag bit, whether shaping bits are present or not in the data provided to the receiver.

According to a second aspect the invention relates to a transmission method for communicating via a communication channel. The transmission method comprises the following steps: determining at least one precoding parameter on the basis of at least one modulation and coding parameter and/or on the basis of at least one further precoding parameter;

precoding a data word into a precoded data word using a probabilistic shaping scheme, wherein the probabilistic shaping scheme depends on the one or more precoding parameters; and encoding the precoded data word using a modulation and/or coding scheme into a codeword, wherein the modulation and/or coding scheme depends on one or more modulation and coding parameters.

Thus, an improved transmission method using a PSCM scheme is provided enabling parameter selection and signaling of signal shaping related parameters, such that they are easy to calculate and are suitable for signaling for alignment with a receiver.

The transmission method according to the second aspect of the invention can be performed by the transmitter according to the first aspect of the invention. Further features of the transmission method according to the second aspect of the invention result directly from the functionality of the transmitter according to the first aspect of the invention and its different implementation forms described above and below.

According to a third aspect the invention relates to a computer program product comprising program code for performing the method according to the second aspect when executed on a computer.

Thus, embodiments of the invention enable selection and signaling of the parameters that are related to shaped polar coding. As already described above, the choice of s and p significantly influences the gain obtained by signal shaping. Therefore, embodiments of the invention allow for an optimal or nearly optimal selection of these parameters, which, however, can depend on the choice of other parameters.

Moreover, in order to revert the signal shaping operations at the receiver side, embodiments of the invention enable the receiver to obtain the values of s and p. As s is in general an integer, its exact value should be known at the transmitter and at the receiver. On the other hand, p is a real valued parameter ($0<=p<=1$), which can also be represented with finite precision and usually an approximation (or a quantized version) of p suffices for both the transmitter and the receiver. In addition, as stated previously, s and p are related to each other. Therefore, if one of them is known, the other one can be obtained using a relation, which can depend on other parameters as well. For instance, as already described above, the dependency, i.e. relation between s and p may depend on the implementation of the precoder. For example, if the precoder is implemented by using a polar decoder, the type of the decoder and the decoder parameters can influence this relation. This makes the relation between s and p different from relations between any other parameters in the transceiver chain, because the relation can be implementation specific. Embodiments of the invention make use of such relations and, thereby, allow to reduce the signaling overhead between the transmitter and the receiver, because signaling of one parameter suffices to obtain the other allowing the receiver to revert the signal shaping operations.

Details of one or more embodiments are set forth in the accompanying drawings and the description below. Other features, objects, and advantages will be apparent from the description, drawings, and claims.

BRIEF DESCRIPTION OF THE DRAWINGS

In the following embodiments of the invention are described in more detail with reference to the attached figures and drawings, in which:

FIG. 4 illustrates an example for an approximate mathematical relation between parameters as implemented in a transmitter of a communication system according to an embodiment of the invention.

In the following identical reference signs refer to identical or at least functionally equivalent features.

DETAILED DESCRIPTION OF THE EMBODIMENTS

In the following description, reference is made to the accompanying figures, which form part of the disclosure, and which show, by way of illustration, specific aspects of embodiments of the invention or specific aspects in which embodiments of the present invention may be used. It is understood that embodiments of the invention may be used in other aspects and comprise structural or logical changes not depicted in the figures. The following detailed description, therefore, is not to be taken in a limiting sense, and the scope of the present invention is defined by the appended claims.

For instance, it is to be understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Figure 1:
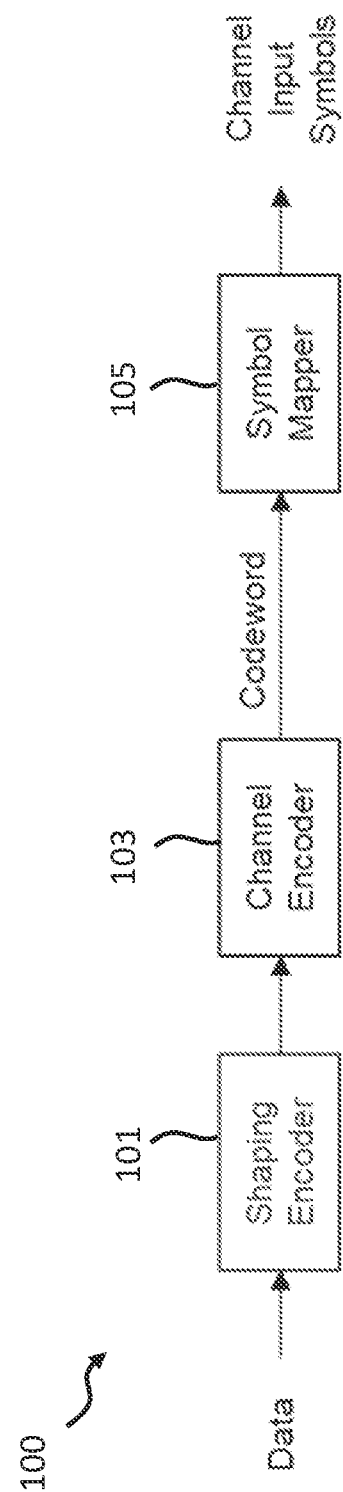
FIG. 1 is a schematic block diagram illustrating an example of a transmitter of a communication system using probabilistic shaping.
Figure 2:
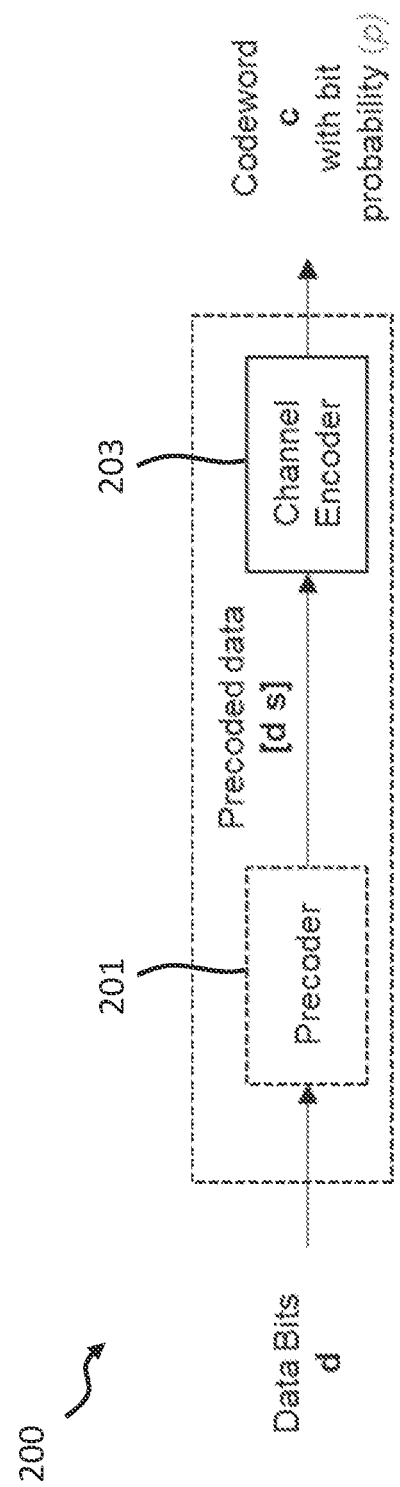
FIG. 2 is a schematic block diagram illustrating an example of a transmitter of a communication system using probabilistic shaping based on polar codes.
Figure 3:
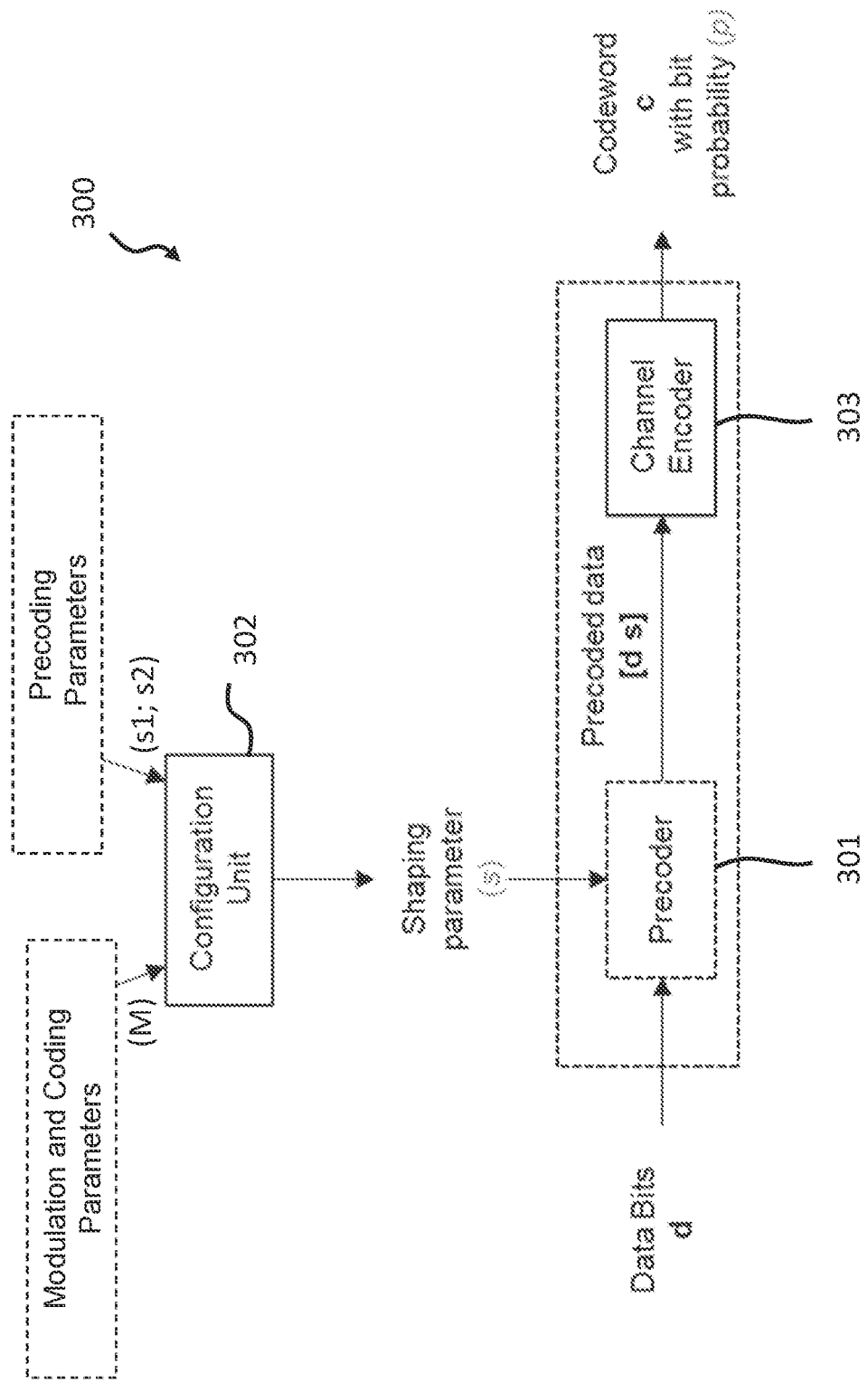
FIG. 3 is a schematic block diagram illustrating an example of a transmitter of a communication system using probabilistic shaping according to an embodiment of the invention.

FIG. 3 shows a block diagram illustrating a transmitter 300 according to an embodiment of the invention. The transmitter 300 shown in FIG. 3 comprises a precoder 301, a channel encoder 303 as well as a configuration unit 302 and is configured to communicate with a receiver via a communication channel. To this end, the transmitter 300 can comprise further components not shown in FIG. 3, such as an RF antenna, a symbol mapper and the like.

The precoder 301 of the transmitter 300 is configured to precode a data word d into a precoded data word using a probabilistic shaping scheme, wherein the probabilistic shaping scheme depends on one or more precoding parameters s1, s2.

The channel encoder 303 of the transmitter 300 is configured to encode the precoded data word using a modulation and/or coding scheme into a codeword c, wherein the modulation and/or coding scheme depends on one or more modulation and coding parameters M.

As will be described in more detail below, the configuration unit 302 of the transmitter 300 is configured to determine at least one precoding parameter s1 on the basis of at least one modulation and coding parameter, i.e. at least one of the one or more modulation and coding parameters M and/or on the basis of at least one further precoding parameter s2. In an embodiment, the transmitter 300 is further configured to provide the at least one modulation and coding parameter M and/or the at least one further precoding parameter s2 to the receiver.

Thus, the configuration unit 302 of the transmitter can generate the required parameters depending on the existing parameters. Consequently, the configuration unit 302 does not only allow a systematic way of obtaining the required parameters, but is also advantageous for reducing the signaling overhead. If the same configuration unit 302 is used both at the transmitter 300 and at the receiver, only a small amount of signaling is sufficient to align parameters on both sides of the communication system.

In the embodiment shown in FIG. 3 the transmitter 300 (as well as the receiver) are parts of a Polar coded PSCM system, which can rely, for instance, on the recently developed 'Shaped Polar (sPolar) Coding' concept. As already described above, shaped polar codes combine PSCM with polar codes in such a way that the shaping encoder, i.e. precoder 301 of the transmitter 300 can be realized by a polar decoder 301. This is particularly advantageous, because this removes the necessity for an additional hardware for PSCM, as the polar decoder 301 is already included in a receiver chain if the communication is bidirectional. As the polar decoder 301 can be implemented in different ways and different types of polar decoders exists, the precoding parameters required for the shaping encoder 301 are "implementation specific". In other words, depending on its implementation, the input parameters, i.e. precoding parameters of the shaping encoder 301 can differ, while providing the same target output. Therefore, the output of the configuration unit 302 of the transmitter 300 shown in FIG. 3 does not only depend on the modulation and coding parameters, but also on the implementation specific precoding parameters. According to an embodiment, the channel decoder 301 is a Successive Cancellation (SC) decoder, a SC List (SCL) decoder, a Belief Propagation (BP) decoder, a flip decoder, a stack decoder or a non-binary decoder.

For the embodiment shown in FIG. 3, where the shaping encoder, i.e. the precoder 301 is provided by a polar decoder, the precoded data word [d s] comprises the data word d, as illustrated in FIG. 3. In this embodiment, the precoded data word comprises at least one shaping bit (s denotes the shaping bits here) and the configuration unit 302 of the transmitter 300 can be configured to determine the number of shaping bits on the basis of the at least one of the modulation and coding parameters and/or on the basis of the at least one further precoding parameter.

As already described above, FIG. 3 illustrates the interaction between the configuration unit 302 and the other components of the transmitter 300. A similar relation also exists for the receiver. In the embodiment shown in FIG. 3, the task of the configuration unit 302 is to determine the shaping parameters, which, as already described above, depend on two different sets of parameters, namely the modulation and coding specific parameters and the precoding specific parameters.

The modulation and coding specific parameters are often already specified in conventional communication systems. According to an embodiment, the modulation and coding parameters can comprise a codeword length n, a message length k, a modulation order m, a code rate, a constellation, and/or a modulation and coding scheme (MCS) index. According to an embodiment, the transmitter 300 is configured to signal the one or more modulation and coding parameters to the receiver via a control channel in order to align the transmitter and receiver side operations.

The precoding parameters, e.g. the parameters relating to the specific implementation of the precoder 301, are usually not specified, as they are implementation specific. For example, as already described above, the precoder 301 can be provided by a polar decoder. In this case, the type of the decoder (SC, SCL, BP, etc.), and their parameters (such as list size for SCL decoder, iteration number for BP decoder, and the like), can be seen as precoding parameters. In other words, according to an embodiment the at least one precoding parameter can be a parameter specific to the implementation of the precoder 301, in particular an identifier of the specific type of the precoder 301 and/or a parameter of the specific type of the precoder 301.

As already described above, the choice of the at least one precoding, i.e. shaping parameter directly influences the overall performance of the transmitter 300 and the communication system. According to an embodiment, the transmitter 300 is configured to determine the at least one precoding parameter by using a lookup table, an analytical function and/or a characteristic curve, as will be described in more detail below. According to an embodiment, the at least one precoding parameter is a parameter specific to the channel decoder 301, in particular a list size, a sequence of frozen bits, a set of frozen sub-channel indices, an iteration number, and/or a Galois field size.

In the following an exemplary embodiment of the configuration unit 302 will be described in more detail, where the configuration unit 302 is configured to determine the number of shaping bits s on the basis of a predefined target bit probability p or vice versa (as well as on the basis of a modulation and coding parameter). To obtain an accurate relation between s and p, according to an embodiment the configuration unit 302 can be configured to use numerical simulations for different sets of parameters. For a large set of parameters, the dependency between these two parameters can be determined and defined in large look-up tables. Although this gives a very accurate solution, it requires a large storage, and may not be feasible for applications where flexibility in terms of parameters are required. However, by using curve fitting algorithms, one can derive analytical functions that can approximate the results of the look-up table in an efficient way. Thus, according to an embodiment the configuration unit 302 can be configured to use the analytical function illustrated in FIG. 4 for determining the number of shaping bits s on the basis of a predefined target bit probability p or vice versa. In the analytical function illustrated in FIG. 4, $h_2(p)=(-p\log(p)-(1-p)\log(1-p))$ is the binary entropy function, n denotes the codeword length and L denotes the list size of the precoder 301, which in this case is provided by a SCL decoder 301. Thus, n is a modulation and coding specific parameter, whereas L is a precoding specific parameter. In this example, the relation between s and p depends on both types of parameters. Allowing the configuration unit 302 to determine the relation between s and p on the basis of an analytical function, such as the analytical function illustrated in FIG. 4, requires less memory resources than, for instance, using a look-up table.

Depending on L, the parameters $M_L$ and/or $B_L$ can be numerically determined. This can be achieved by performing simulations and/or curve fitting methods. For example, for different choices of s one can evaluate the resulting p by running Monte-carlo simulations, which then can be used as input for curve fitting algorithms e.g. to obtain curve parameters, e.g. coefficients of a polynomial and/or any other analytical function. This method can be further extended to take other parameters into account.

According to an embodiment, the configuration unit 302 can be further configured to determine an optimal value of the at least one precoding parameter, e.g. the the number of shaping bits s and/or the bit probability p. As will be appreciated, however, in the embodiment described above, where the configuration unit 302 is configured to determine the number of shaping bits s on the basis of a predefined target bit probability p or vice versa, it is sufficient to determine the optimal value for at least one of these precoding parameters. Again, by numerical simulations, the optimal choice of the parameter s for different choices of the modulation and coding specific parameters (n, codeword length), (k, message length), (m, modulation order) and precoding specific parameters (L, list size of the SCL decoder) can be determined and implemented in the configuration unit 302. The optimal choice of the parameter s leads to the best overall system performance. However, after analyzing all the obtained optimal values certain relations between the optimal value s and the other parameters can be obtained. For example, for a large set of parameters, the optimal value of s and the ratio s/(n−k) is almost constant, where the constant value may depend on the implementation specific parameters, such as the list size L.

Thus, the configuration unit 302 can obtain the precoding parameters p and s in an efficient way. For alignment between the transmitter 300 and the receiver, all parameters should be known by both the transmitter 300 and the receiver. By placing the configuration unit 302 both at the transmitter 300 and at the receiver, the signaling overhead can be reduced. Since the configuration unit 302 already contains the relations between these parameters, not all of the parameters need to be signaled to the receiver.

In the following further embodiments of the transmitter 300 will be described, which support different signaling procedures between the transmitter 300 and the receiver.

According to an embodiment, the transmitter 300 is configured to choose, i.e. determine the number of shaping bits s using the configuration unit 302 at the transmitter 300, and s is signaled to the receiver via a control channel. According to an embodiment, the transmitter 300 further obtains p using the configuration unit 302 and also signals the value of p (or a quantized version thereof) via the control channel to the receiver. If p is not signaled by the transmitter 300, the receiver can obtain p from s by using the configuration unit at the receiver. According to an alternative embodiment, the receiver obtains p blindly (in this case, no configuration unit is needed at the receiver), if p is not signaled by the transmitter 300. In general, the blind detection (e.g. of p) can be done, e.g. by trying to decode using predefined sets of the precoder parameters. Among the precoder parameter sets, the most likely set in the sense of the maximum likelihood decoding, or the set which resulted in the minimum decoding error (in the sense of the minimum error decoding), may be considered as the desired precoder parameter set.

According to an embodiment, the transmitter 300 is configured to choose, i.e. determine s on the basis of the modulation and coding specific parameters alone by using the configuration unit 302 (assuming fixed precoding parameters). According to an embodiment, the transmitter 300 further obtains p using the configuration unit 302 and signals the value of p (or a quantized version thereof) via the control channel to the receiver. If p is not signaled by the transmitter 300, the receiver can obtain p from s by using the configuration unit at the receiver. According to an alternative embodiment, the receiver obtains p blindly (in this case, no configuration unit is needed at the receiver), if p is not signaled by the transmitter 300.

According to an embodiment, the transmitter 300 is configured to choose. i.e. determine s from a set of limited cardinalities. For example, the configuration unit 302 can be configured to support only a limited number of different choices for s, or a function of s, such as s/h, or s/(n−k). This is advantageous, because this reduces the signaling overhead. For example, if only 32 combinations are supported, 5 bits suffice for signaling.

According to an embodiment, the configuration unit 302 is configured to set. i.e. determine s in such a way that existing parameters (already signaled parameters) at the receiver are sufficient to obtain s without signaling the actual value thereof. In this case, 1-bit signaling would be sufficient (shaping on/off signaling).

Figure 5:
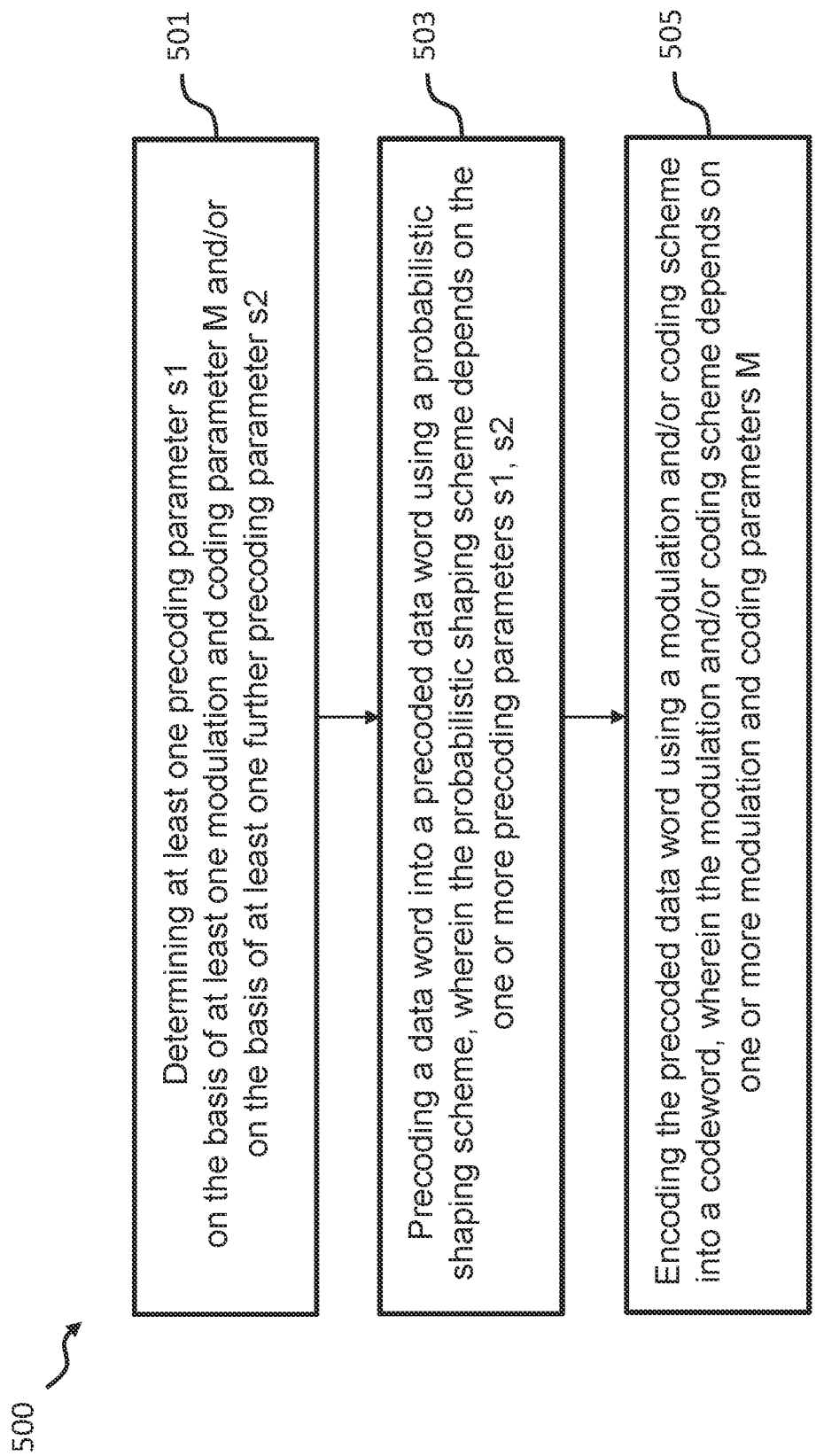
FIG. 5 is a flow diagram showing an example of a transmission method according to an embodiment of the invention.

FIG. 5 is a flow diagram showing an example of a corresponding transmission method 500 according to an embodiment of the invention. The method 500 comprises the steps of: determining 501 at least one precoding parameter s1 on the basis of at least one modulation and coding parameter M and/or on the basis of at least one further precoding parameter s2; precoding 503 a data word into a precoded data word using a probabilistic shaping scheme, wherein the probabilistic shaping scheme depends on the one or more precoding parameters s1, s2; and encoding 505 the precoded data word using a modulation and/or coding scheme into a codeword, wherein the modulation and/or coding scheme depends on one or more modulation and coding parameters M.

The person skilled in the art will understand that the "blocks" ("units") of the various figures (method and apparatus) represent or describe functionalities of embodiments of the invention (rather than necessarily individual "units" in hardware or software) and thus describe equally functions or features of apparatus embodiments as well as method embodiments (unit=step).

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

The invention claimed is:

1. A transmitter configured to communicate with a receiver via a communication channel, the transmitter configured to:

determine at least one precoding parameter on the basis of at least one modulation and coding parameter or on the basis of at least one further precoding parameter;

determine a number of shaping bits on the basis of the at least one of the modulation and coding parameters or on the basis of the at least one further precoding parameter;

precode a data word into a precoded data word using a probabilistic shaping scheme, wherein the probabilistic shaping scheme depends on the at least one precoding parameter, and wherein the precoded data word comprises the number of shaping bits; and encode the precoded data word into a codeword using a modulation or coding scheme, wherein the modulation or coding scheme depends on one or more modulation and coding parameters.

2. The transmitter of claim 1, wherein the transmitter is further configured to provide the at least one of the one or more modulation and coding parameters or the at least one further precoding parameter to the receiver.

3. The transmitter of claim 1, wherein the at least one precoding parameter is a parameter specific to an implementation of a precoder that performs the precoding, and wherein the at least one precoding parameter comprises an identifier of a specific precoder type or a parameter of the specific precoder type.

4. The transmitter of claim 1, wherein the one or more modulation and coding parameters comprise at least one of a codeword length, a message length, a modulation order, a code rate, a constellation, or a modulation and coding scheme index.

5. The transmitter of claim 1, wherein the transmitter is further configured to determine the at least one precoding parameter by using a lookup table, an analytical function, or a characteristic curve.

6. The transmitter of claim 1, wherein the encoding the precoded data word is based on a polar code.

7. The transmitter of claim 6, wherein the precoded data word comprises the data word.

8. The transmitter of claim 7, wherein the transmitter is further configured to determine a number of shaping bits by selecting the number of shaping bits from a predefined set of possible numbers of shaping bits.

9. The transmitter of claim 7, wherein the transmitter is further configured to determine a bit probability of bits in the codeword, wherein determining the bit probability of the bits in the codeword comprises determining a bit probability of a predefined subset of the bits in the codeword.

10. The transmitter of claim 9, wherein the transmitter is configured to provide the bit probability to the receiver.

11. The transmitter of claim 9, configured to determine the bit probability on the basis of a number of shaping bits and on the basis of the one or more modulation and coding parameters.

12. The transmitter of claim 9, wherein the transmitter is configured to determine the bit probability on the basis of the at least one of the modulation and coding parameters or on the basis of the at least one further precoding parameter.

13. The transmitter of claim 1, wherein the precoding the data word is based on a channel decoder, and wherein the channel decoder comprises a channel decoder for a polar code.

14. The transmitter of claim 13, wherein the channel decoder is a Successive Cancellation (SC) decoder, a SC List (SCL) decoder, a Belief Propagation (BP) decoder, a flip decoder, a stack decoder, or a non-binary decoder.

15. The transmitter of claim 14, wherein the at least one precoding parameter is a parameter specific to the channel decoder, and wherein the at least one precoding parameter comprises at least one of a list size, a sequence of frozen bits, a set of frozen sub-channel indices, an iteration number, or a Galois field size.

16. The transmitter of claim 1, wherein the transmitter is further configured to activate or deactivate the precoding, and wherein the transmitter is further configured to inform the receiver whether the codeword has been generated with the precoding being active or inactive, or wherein the transmitter is configured to provide an indication whether shaping bits are present or not in data provided to the receiver.

17. A transmission method for communicating via a communication channel, the transmission method comprising:

determining at least one precoding parameter on the basis of at least one modulation and coding parameter or on the basis of at least one further precoding parameter;

determining a number of shaping bits on the basis of the at least one of the modulation and coding parameters or on the basis of the at least one further precoding parameter;

precoding a data word into a precoded data word using a probabilistic shaping scheme, wherein the probabilistic shaping scheme depends on the at least one precoding parameter, and wherein the precoded data word comprises the number of shaping bits; and encoding the precoded data word into a codeword using a modulation or coding scheme, wherein the modulation or coding scheme depends on one or more modulation and coding parameters.

18. A non-transitory computer-readable storage medium comprising program code for execution by at least one processor to:

determine at least one precoding parameter on the basis of at least one modulation and coding parameter or on the basis of at least one further precoding parameter;

determine a number of shaping bits on the basis of the at least one of the modulation and coding parameters or on the basis of the at least one further precoding parameter;

precode a data word into a precoded data word using a probabilistic shaping scheme, wherein the probabilistic shaping scheme depends on the at least one precoding parameter, and wherein the precoded data word comprises the number of shaping bits; and encode the precoded data word into a codeword using a modulation or coding scheme, wherein the modulation or coding scheme depends on one or more modulation and coding parameters.

19. The non-transitory computer-readable storage medium of claim 18, wherein the one or more modulation and coding parameters comprise at least one of a codeword length, a message length, a modulation order, a code rate, a constellation, or a modulation and coding scheme index.

* * * * *